UNITED STATES PATENT OFFICE.

JAMES C. AYER, OF LOWELL, MASSACHUSETTS.

IMPROVED PROCESS FOR DISINTEGRATING, DESULPHURIZING, AND OXIDIZING ORES.

Specification forming part of Letters Patent No. 46,621, dated March 7, 1865; antedated January 24, 1865.

*To all whom it may concern:*

Be it known that I, JAMES C. AYER, of Lowell, in the county of Middlesex and State of Massachusetts, have discovered and applied a new and Improved Process for Desulphurizing, Oxidizing, and Disintegrating Metalliferous Ores; and I do hereby declare that the following is a full and exact description thereof in such detail as will enable any person skilled in the art to practice and perform the same.

My invention or discovery particularly relates to the treatment of quartz-rock or ores containing the precious metals preparatory to the amalgamating process, but is applicable to other ores than those which are auriferous or argentiferous; and the object of my invention or discovery is, first, the speedy and effectual disintegration of the rock or ores, &c.; second, the complete desulphurization of the same after disintegration, or while the same is going on; and, third, the complete oxidation of the baser metals contained in said ores, thus leaving the precious metals contained in said ores, all or nearly all, free for amalgamation This process, while it is speedy and effectual, is at the same time cheap and simple to perform, and the assay of the precious metals is reached, or nearly reached, by amalgamation.

I will describe my process as applicable to the gold and silver ores, which process may be observed in the treatment of other ores for the purpose of their disintegration, desulphurization, and oxidation.

I take masses of quartz-rock or ores which contain precious metals in the condition such masses come from the mine, and place them in a furnace or chamber so arranged that the rock or ores can be subjected to a high degree of heat less than sufficient to smelt the same, and while so heated the rock or ores can be cooled by a spray-jet or bath of water forced upon them while in their highly-heated state, or by the continuous application of the water while stirring the ore. This treatment disintegrates the rocks or ores, and partially desulphurizes the same if the ores contain the sulphurets. When cooled, and the rock or ores have absorbed all the water that they will take, they are again reheated, during which the heat so acts upon the rock or ores thus impregnated with the water as to effect its further disintegration, and when the rock or ores are again in a high state of heat they are again cooled by the same process, and this operation may be further continued and repeated a greater or less number of times, according to the refractory qualities of the ores or rock, (care being taken not to melt the same,) until the rock or ores are completely disintegrated, desulphurized, and the base metals oxidized, leaving the precious metals therein contained free, or nearly free, for amalgamation.

The foregoing treatment of the rock or ores completely effects thus disintegration, expels the sulphur, arsenic, and other foreign matter contained in said ores, and oxidizes the baser metals, and so reduces the ores that they can be easily ground or pulverized, and leave the precious metals contained in the rock or ores, all or nearly all, free for amalgamation.

Having thus described my invention or discovery, what I claim as new, and desire to secure by Letters Patent of the United States, is—

1. The application of treating ores while in a heated state with water, substantially as described, for the purposes of partial disintegration, desulphurization, and oxidation of the base metals in same.

2. Reheating ores which have been treated substantially as above described, and repeating the same for the complete disintegration, desulphurization, and oxidation of the base metals in the same.

JAMES C. AYER.

Witnesses:
A. H. TAYLOR,
BENJ. WALKER.